United States Patent [19]

Sato

[11] Patent Number: 4,685,006
[45] Date of Patent: Aug. 4, 1987

[54] MAGNETIC RECORDING-REPRODUCING DEVICE

[75] Inventor: Kazuo Sato, Kakuda, Japan

[73] Assignee: Alps Electric Co., Ltd., Japan

[21] Appl. No.: 860,531

[22] Filed: May 7, 1986

[30] Foreign Application Priority Data

May 7, 1985 [JP] Japan .................................. 60-96383

[51] Int. Cl.$^4$ .......................................... G11B 15/14
[52] U.S. Cl. ............................................... 360/64
[58] Field of Search .......................................... 360/64

[56] References Cited

U.S. PATENT DOCUMENTS

| 2,979,562 | 4/1961 | Leyton | 360/64 |
| 3,862,355 | 1/1975 | Guisinger | 360/64 |
| 4,011,587 | 3/1977 | Arter et al. | 360/64 |
| 4,021,857 | 5/1977 | Tanimura | 360/64 |
| 4,071,856 | 1/1978 | Kihara et al. | 360/64 |
| 4,120,007 | 10/1978 | Sato | 360/64 |
| 4,139,871 | 2/1979 | Yoshida et al. | 360/64 |
| 4,361,856 | 11/1982 | Okamoto | 360/64 |
| 4,412,259 | 10/1983 | Hiraguri | 360/77 |
| 4,600,953 | 7/1986 | Furuhata et al. | 360/64 |

Primary Examiner—George G. Stellar
Attorney, Agent, or Firm—Guy W. Shoup

[57] ABSTRACT

A magnetic recording-reproducing device for recording a signal on a magnetic tape and/or reading out a signal from the magnetic tape to reproduce the same while running the magnetic tape in contact with a rotary drum having at least two heads, which is characterized in that it comprises a frequency generator for generating a pulse train having a frequency proportional to the rotating speed of the rotary drum, a pulse generating unit for generating a pulse indicating the direction/position of rotation of each head each time the rotary drum rotates a certain angle of rotation, a delay circuit for delaying the phase of the pulse supplied from the pulse generating unit, and a gate circuit for computing the logical product of the pulse supplied from the delay circuit and the pulse supplied from the frequency generator, wherein the pulse supplied from the gate circuit is treated as a pulse indicating a true head position, whereby the true head position pulse can be generated electrically, easily and accurately when the head has come to a definite position.

7 Claims, 7 Drawing Figures

MAGNETIC RECORDING-REPRODUCING DEVICE

BACKGROUND OF THE INVENTION

1. Field of the Invention

This invention relates to a magnetic read/write system and, more particularly, to a magnetic recording-reproducing device capable of adjusting electrically the phase of a pulse indicating the direction/position of rotation of a head.

2. Description of the Prior Art

In the video tape recorder (VTR), two recording/reproducing heads (video heads) are mounted with a spacing of 180° left therebetween on a rotary drum, a magnetic tape is run while being caused to contact obliquely with the cylinder surface of the rotary drum so that the running track (named "video track") of each head on the magnetic tape is inclined with respect to the lengthwise direction of the tape and the running tracks of respective heads are offset from each other successively by one track pitch, and the two heads are switched and put into operation alternately, whereby a signal is recorded on the magnetic tape and/or read therefrom to reproduce the same. That is, the signal is successively recorded on the magnetic tape and/or read therefrom while the two heads are scanning alternately, in such a mode of operation as to cut a thread, the surface of the magnetic tape which runs while being coiled round the cylinder surface of the rotary drum. Because the head is rotated at a rotating speed (30 rps) identical to the frame frequency of the TV signal, the amount of information of the TV signal corresponding to one field is recorded in one video track during one rotation.

As is well known in the art, it is required that a recording signal be applied to alternate head and recorded on the magnetic tape field by field or a signal be pulled out from alternate head to reproduce the same, and recording or reading of the one-field information carried out by alternate head be commenced at a definite position at which the magnetic tape starts to contact with the rotary drum. Namely, a signal indicating that the head has come to the definite position must be generated always, on the basis of which several processes, such as switching of the heads and branching of the signal, must be commenced.

In view of the foregoing circumstances, according to the prior art, magnet segments of N-pole and S-pole are attached at a spacing of 180° to a rotary member rotatable integrally together with the rotary drum, and a magnetic sensor (such as, pickup coil or Hall element) is provided on a fixing member with leaving a certain gap between it and the rotating path of the magnet segments; these making up a pulse generating unit. By the foregoing configuration, positive-polarity and negative-polarity pulses (referred to as a head position pulse) are generated alternately by the magnetic sensor in response to rotation of the rotary drum each time the N-pole and S-pole magnet segments come to opposition to the magnetic sensor, and in this connection, the mounting positions of the magnet segments and/or magnetic sensor are adjusted so that the head position pulse may be generated each time the head comes to the definite position.

However, the work of adjusting the phase (timing) of generation of the head position pulse through mechanical adjustment of the mounting positions of the magnet segments and/or magnetic sensor is very troublesome and needs a comparatively long time for adjustment.

SUMMARY OF THE INVENTION

It is a general object of the present invention to provide a magnetic recording-reproducing device which permits electrical adjustment of the phase of a head position pulse.

In brief, the present invention resides in a magnetic recording-reproducing device for recording a signal on a magnetic tape and/or reading out a signal from the magnetic tape to reproduce the same while running the magnetic tape in contact with a rotary drum having at least two heads, which is characterized in that it comprises (a) a frequency generator for generating a pulse train having a frequency proportional to the rotating speed of the rotary drum, (b) a pulse generating unit for generating a pulse indicating the direction/position of rotation of each head each time the rotary drum rotates a certain angle of rotation, (c) a delay circuit for delaying the phase of the pulse supplied from the pulse generating unit, and (d) a gate circuit for computing the logical product of the pulse supplied from the delay circuit and the pulse supplied from the frequency generator.

In operation, the drum having two heads with a spacing of 180° left therebetween is rotated and the magnetic tape is run in contact with the rotary drum, during which a signal is recorded on the magnetic tape or read out therefrom to reproduce the same. In the course of the above operation, a pulse train having a frequency proportional to the rotary speed of the rotary drum is generated by the frequency generator, and a head position pulse indicating the direction/position of rotation of each head is generated by the pulse generating unit each time the rotary drum rotates a certain angle of rotation.

In case the generation timing of the head position pulse differs from the moment at which the head comes to a definite position (for example, the position at which the magnetic tape starts to contact with the rotary drum), the phase and pulse duration of the head position pulse is adjusted in the delay circuit capable of adjusting a delay time and pulse duration. In the succeeding stage or gate circuit, the logical product of the pulse supplied from the delay circuit and the pulse supplied from the frequency generator is computed to generate a pulse, and this resultant pulse, treating it as a head position pulse indicating the true head position, is used to commence the process of changeover of the heads and the like.

As will be apparent from the foregoing, only through adjustment of the phase and pulse duration of the head position pulse supplied from the pulse generating unit, the magnetic recording-reproducing device can be set correctly so that the true head position pulse can be generated each time the head comes to a definite position; thus, the work of adjustment becomes simplified.

DESCRIPTION OF THE PREFERRED EMBODIMENTS

Figure 1A:
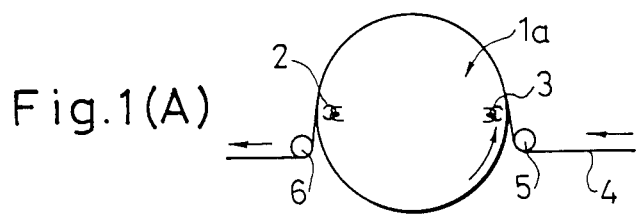
FIG. 1 consisting of FIGS. 1A and 1B is a schematic diagram showing a rotary drum section of a magnetic recording-reproducing device according to the present invention.
Figure 1B:
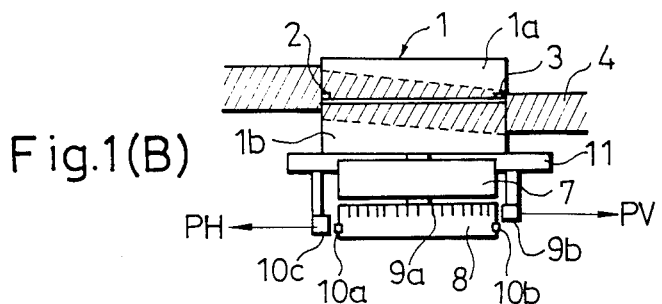
Figure 2:
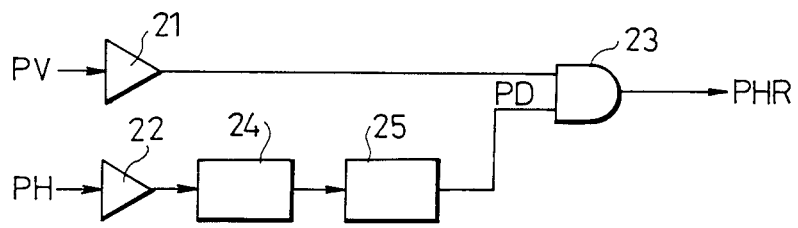
FIG. 2 is a block diagram of a first embodiment of a signal circuit.
Figure 3:
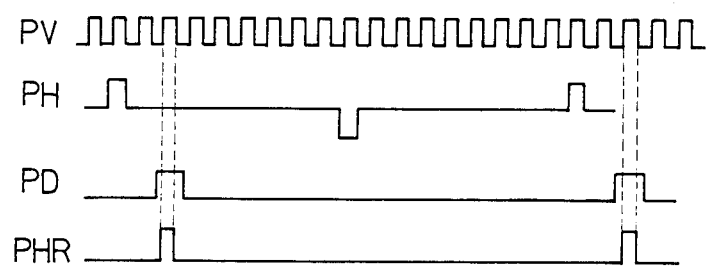
FIG. 3 is a waveform diagram showing signals at several points of the circuit shown in FIG. 2.

The first embodiment of a magnetic recording-reproducing device according to the present invention will now be described with reference to FIG. 1 showing schematically a rotary drum section of the magnetic recording-reproducing device according to the present invention, FIG. 2 showing in block form a signal circuit, and FIG. 3 showing several waveforms.

A rotary drum 1 consists of an upper rotary drum 1a and a lower stationary drum 1b, and the upper drum is equipped with two opposed recording/reproducing heads (video heads) 2, 3 so that they have a phase difference of 180° therebetween. A magnetic tape 4 passes by a post 5, runs along the cylinder surface of upper and lower drums 1a, 1b of the rotary drum 1 in contact obliquely therewith, and after passed by a post 6, is led toward a take-up reel. In the foregoing operation, the running track (video track) each of the video heads 2, 3 on the magnetic tape 4 is inclined relatively with respect to the lengthwise direction of the tape and each running track of the video heads is offset one track pitch from adjacent tracks successively; thus, a signal is recorded on the magnetic tape 4 or read therefrom to reproduce the same while switching and putting the two video heads 2, 3 alternately into operation. Reference numeral 7 indicates a drum motor for driving directly the upper drum 1b; but, this direct drive system is not necessarily required and the motor may be located at a different position to achieve belt driving etc.

To the shaft of the drum motor 7 a rotary member 8 is attached so as to rotate integrally together with the rotary drum 1, an upper portion of the peripheral surface of the rotary member 8 is magnetized as indicated by "9a", and to a lower portion of the peripheral surface, magnet segments 10a, 10b of N-pole and S-pole are attached with a spacing of 180° left therebetween. To leg sections of a cylinder base 11, magnetic sensors (such as, pickup coil or Hall element) 9b, 10c are attached in opposition, respectively, to the magnetized portion 9a and magnet segments 10a, 10b with a certain gap left between them and the rotating path of the magnetized portion and magnet segments.

The magnetized portion 9a and magnetic sensor 9b make up a frequency generator, and this magnetic sensor 9b generates one pulse PV each time the rotary drum 1 rotates and its magnetized portion 9a comes to opposition thereto. Namely, the magnetic sensor 9b generates a pulse train having a frequency proportional to the rotating speed of the rotary drum 1.

The magnet segments 10a, 10b and magnetic sensor 10c make up a pulse generating unit which generates a head position pulse PH indicating the direction/position of rotation of each video head 2, 3, and positive-polarity and negative-polarity pulses (referred to as the head position pulse) PH are generated alternately by the magnetic sensor 10c each time the magnet segments 10a, 10b of N-pole and S-pole come to opposition to the magnetic sensor 10c.

These pulses PV, PH are applied respectively to amplifiers 21, 22 and thereby amplified, and the pulse PV is applied to a first input terminal of an AND gate 23. On the other hand, the head position pulse PH is applied to a first delay circuit 24 in which it is delayed a certain time (a certain phase angle), then it is converted by a second delay circuit 25 into a pulse PD having such a phase and duration as able to extract one pulse of the pulse train PV, and thereafter applied to a second input terminal of the AND gate 23. The AND gate 23 computes the logical product of the pulses PV and PD to generate a true head position pulse PHR. Because each of the delay circuits 24, 25 is provided with means (such as variable resistor) for adjusting the phase and/or pulse duration of an incoming pulse, by controlling such means the true head position pulse PHR can be made to be generated when the head has come to a definite position. Apparently, the true head position pulse PHR indicates that one head (the first video head) has come to the definite position, not that the other head (the second video head) has come to that definite position. This difficulty can be overcome by counting the number N of pulses of the pulse train PV generated during one period of the head position pulse PHR, counting the pulses PV generated after appearance of the head position pulse PHR, and generating the position pulse of the second video head at the moment when the count has reached N/2.

Figure 4:
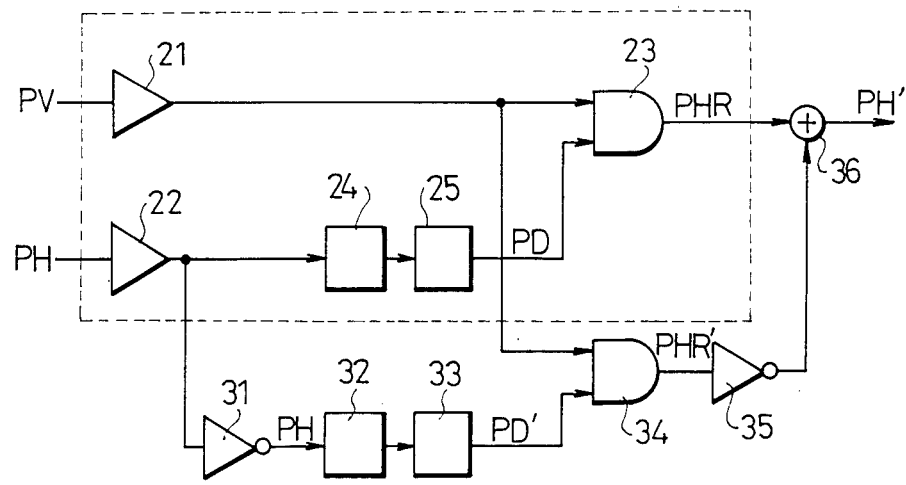
FIG. 4 is a block diagram of a second embodiment of the signal circuit.
Figure 5:
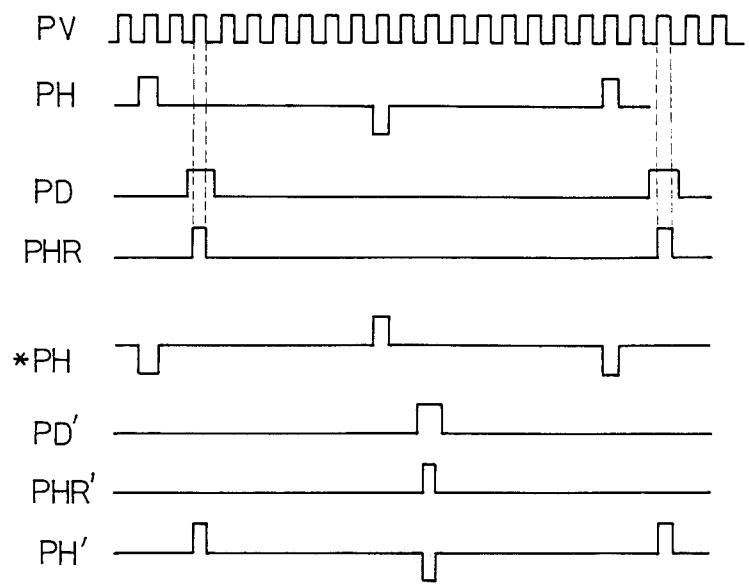
FIG. 5 is a waveform diagram showing signals at several points of the circuit shown in FIG. 4.

FIG. 4 is the explanation view of the second embodiment of the present invention, and FIG. 5 is the waveform diagram relating to the second embodiment. In FIG. 4, the operation of the section enclosed by the dotted line is identical to that of the circuit shown in FIG. 2, thus no further description is given here.

Although in FIG. 2 the head position pulse PHR of the first video head only is generated, the embodiment of FIG. 4 is designed so that it generates the head position pulses of both heads.

The head position pulse PH amplified by the amplifier 22 is inverted in polarity by an inverter 31. The polarity-inverted signal *PH is applied to a third delay circuit 32 and thereby delayed a certain time (a certain phase angle), then it is converted by a fourth delay circuit 33 into a pulse PD' having such a phase and duration as able to extract one pulse PV, and applied to a second input terminal of an AND gate 34. The AND gate 34 computes the logical product of the pulses PV and PD' to generate a true head position pulse PHR' of the second video head. Because each of the delay circuits 32, 33 is provided with means (such as variable resistor) for adjusting the phase and/or pulse duration of an incoming pulse, by controlling such means the true head position pulse PHR' can be made to be generated when the second video head has come to the definite position.

The head position pulse PHR' in then inverted in polarity by an inverter 35, added in an analog adder 36 to the head position pulse PHR of the first video head, and output in the form of a pulse PH'. By the use of this pulse PH' the process of changeover of the heads and other processes are commenced.

Figure 6:
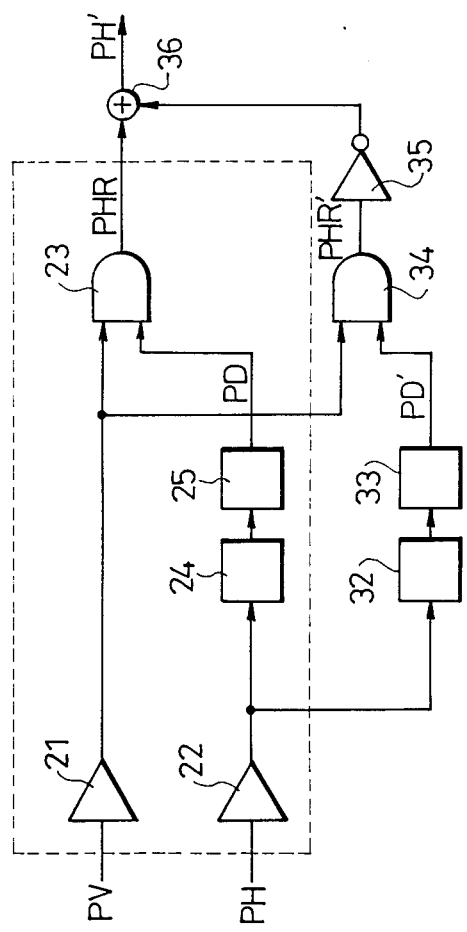
FIG. 6 is a block diagram of a third embodiment of the signal circuit.

As a further modification, the inverter 31 included in the configuration shown in FIG. 4 may be eliminated to result in the configuration shown in FIG. 6. In this case, the phase of the head position pulse PH is delayed about 180° by the third delay circuit 32, for example.

Although the present invention has been described hereinabove as being applied to the VTR, it is needless to mention that the present invention can be applied to a rotary head type digital audio device and the like other than the VTR. Further, although the embodiments including two recording/reproducing heads have been described, the present invention should not be limited to such a device including two heads, but can be applied to a device including two recording heads and two reproducing heads.

As described hereinabove, since the magnetic recording-reproducing device according to the present invention includes the frequency generator for generating a pulse train having a frequency proportional to the rotating speed of the rotary drum, the pulse generating unit for generating a pulse indicating the direction/position of rotation of each head each time the rotary drum rotates a certain angle of rotation, the delay circuit for delaying the phase of the pulse supplied from the pulse generating unit, and the gate circuit for computing the logical product of the pulse supplied from the delay circuit and the pulse supplied from the frequency generator, the head position pulse can be generated electrically, easily and accurately when the head has come to a definite position.

What is claimed is:

1. A magnetic recording-reproducing device for recording a signal on a magnetic tape and/or reading out a signal from the magnetic tape to reproduce the same while running the magnetic tape in contact with a rotary drum having at least two heads, comprising
   a frequency generator for generating a pulse train having a frequency proportional to the rotating speed of said rotary drum,
   a pulse generating unit for generating a pulse indicating the direction/position of rotation of each of said heads each time said rotary drum rotates a certain angle of rotation,
   a delay circuit for delaying the phase of the pulse supplied from said pulse generating unit, and
   a gate circuit for computing the logical product of the pulse supplied from said delay circuit and the pulse supplied from said frequency generator,
   wherein the pulse supplied from said gate circuit is treated as a pulse indicating a true head position.

2. A magnetic recording-reproducing device according to claim 1, wherein said frequency generator is composed of a magnetized portion provided on a rotary member rotatable integrally together with said rotary drum and a magnetic sensor responsive to said magnetized portion.

3. A magnetic recording-reproducing device according to claim 2, where said pulse generating unit is composed of magnet segments provided on said rotary member and another magnetic sensor responsive to said magnet segments for generating positive-polarity and negative-polarity pulses alternately.

4. A magnetic recording-reproducing device according to claim 1, wherein said delay circuit is composed of a first delay circuit for delaying a supplied pulse a certain time and a second delay circuit connected to said first delay circuit for converting a supplied pulse into a pulse having such a phase and duration as able to extract one pulse of the pulse train generated by said frequency generator.

5. A magnetic recording-reproducing device according to claim 4, wherein each of said first and second delay circuits has means for adjusting the phase and/or pulse duration of a supplied pulse.

6. A magnetic recording-reproducing device according to claim 1, including further an additional delay circuit and an additional gate circuit identical respectively to said delay circuit and said gate circuit, for producing a pulse indicating another true head position.

7. A magnetic recording-reproducing device according to claim 6, including further an inverter for inverting in polarity the pulse supplied from said pulse generating unit to apply the inverted pulse to said another delay circuit.

* * * * *